(12) United States Patent
Jones et al.

(10) Patent No.: US 9,756,318 B2
(45) Date of Patent: Sep. 5, 2017

(54) METHOD OF AND APPARATUS FOR PROCESSING IMAGE DATA FOR DISPLAY BY A MULTIPLE-VIEW DISPLAY DEVICE

(75) Inventors: Graham Roger Jones, Oxford (GB); Benjamin James Hammett, Oxford (GB); Teofilo Emidio De Campos, Oxford (GB)

(73) Assignee: SHARP KABUSHIKI KAISHA, Osaka (JP)

( * ) Notice: Subject to any disclaimer, the term of this patent is extended or adjusted under 35 U.S.C. 154(b) by 1231 days.

(21) Appl. No.: 12/523,450

(22) PCT Filed: Jan. 22, 2008

(86) PCT No.: PCT/JP2008/051150
§ 371 (c)(1),
(2), (4) Date: Jul. 16, 2009

(87) PCT Pub. No.: WO2008/091005
PCT Pub. Date: Jul. 31, 2008

(65) Prior Publication Data
US 2010/0073466 A1    Mar. 25, 2010

(30) Foreign Application Priority Data

Jan. 24, 2007 (GB) .................................. 0701325.3

(51) Int. Cl.
*G02B 27/22* (2006.01)
*H04N 5/14* (2006.01)
(Continued)

(52) U.S. Cl.
CPC ..... *H04N 13/0422* (2013.01); *H04N 13/0003* (2013.01); *H04N 13/0048* (2013.01); *H04N 13/0409* (2013.01); *G02B 27/2214* (2013.01)

(58) Field of Classification Search
CPC .............. G06T 5/001; G06T 5/40; G06K 9/38
See application file for complete search history.

(56) References Cited

U.S. PATENT DOCUMENTS 5,848,196 A * 12/1998 Sharman ........................ 382/260
5,982,442 A * 11/1999 Guntzburger ............ 375/240.24
(Continued)

FOREIGN PATENT DOCUMENTS

CN    1514271 A    7/2004
EP    0 829 744    3/1998
(Continued)

OTHER PUBLICATIONS

International Search Report for PCT/JP2008/051150, mailed Apr. 22, 2008.
(Continued)

*Primary Examiner* — Nicholas Taylor
*Assistant Examiner* — Ho Shiu
(74) *Attorney, Agent, or Firm* — Nixon & Vanderhye P.C.

(57) ABSTRACT

A method is provided for processing image data for display by a multiple-view display device (24) so as to reduce the visibility of undesirable artefacts. Image pixel data are received (20, 21) representing the pixel brightnesses of respective images or sequences of images. The pixel data are processed (22) by applying a unidirectional filter. The processed pixel data for the images may then be interleaved (23) and supplied to the display device (24).

41 Claims, 15 Drawing Sheets

(51) Int. Cl.
*H04N 5/208* (2006.01)
*H04N 5/66* (2006.01)
*H04N 13/04* (2006.01)
*H04N 13/00* (2006.01)

(56) References Cited

U.S. PATENT DOCUMENTS

| | | | |
|---|---|---|---|
| 6,941,013 B1* | 9/2005 | Drayer | 382/168 |
| 6,973,210 B1 | 12/2005 | Platt et al. | |
| 7,016,549 B1* | 3/2006 | Utagawa | 382/261 |
| 2003/0210829 A1 | 11/2003 | Someya et al. | |
| 2004/0057111 A1* | 3/2004 | Dominguez Motntes | 359/462 |
| 2004/0119896 A1 | 6/2004 | Kean et al. | |
| 2004/0165263 A1* | 8/2004 | Sudo et al. | 359/462 |
| 2005/0238228 A1 | 10/2005 | Platt et al. | |
| 2006/0158466 A1 | 7/2006 | Chien et al. | |
| 2006/0215018 A1* | 9/2006 | Fukushima et al. | 348/51 |
| 2006/0232666 A1 | 10/2006 | Op De Beeck et al. | |
| 2006/0238863 A1* | 10/2006 | Saishu | 359/472 |
| 2007/0024614 A1* | 2/2007 | Tam et al. | 345/419 |
| 2007/0296865 A1* | 12/2007 | Mino et al. | 348/571 |
| 2007/0296874 A1 | 12/2007 | Yoshimoto et al. | |
| 2008/0002255 A1* | 1/2008 | Tavor et al. | 359/464 |
| 2008/0013836 A1* | 1/2008 | Nakamura et al. | 382/209 |
| 2008/0013847 A1* | 1/2008 | Li | 382/248 |
| 2008/0117233 A1* | 5/2008 | Mather et al. | 345/690 |
| 2008/0165275 A1* | 7/2008 | Jones et al. | 348/446 |
| 2008/0278808 A1* | 11/2008 | Redert | 359/478 |

FOREIGN PATENT DOCUMENTS

| | | |
|---|---|---|
| EP | 1 427 223 | 6/2004 |
| GB | 2 390 172 | 12/2003 |
| GB | 2 404 106 | 1/2005 |
| GB | 2 428 101 | 1/2007 |
| JP | WO 2006/080540 * | 8/2006 |
| JP | 2007-13534 | 1/2007 |
| WO | WO 2004/039086 | 5/2004 |
| WO | WO 2005/034529 | 4/2005 |
| WO | 2005/120085 | 12/2005 |
| WO | WO 2006/049213 A1 | 5/2006 |
| WO | WO 2006/110646 | 10/2006 |

OTHER PUBLICATIONS

Written Opinion of the International Searching Authority for PCT/JP2008/051150, mailed Apr. 22, 2009.
UK Search Report for GB 0701325.3, dated Apr. 24, 2007.
Japanese Office Action issued in Japanese Patent Application No. 2009-511277, mailed Jun. 21, 2011 with English Translation.

* cited by examiner

FIG. 7

$$f(p_{n-1}) = 1/S * \boxed{\begin{array}{|c|c|c|} A & B & C \end{array}} * \boxed{\begin{array}{|c|c|c|} p_{n-2} & p_{n-1} & p_n \end{array}}$$

$$= 1/S * ( (A*p_{n-2}) + (B*p_{n-1}) + (C*p_n) )$$

e.g. $\quad 1/2 * \boxed{\begin{array}{|c|c|c|} 0 & 1 & 1 \end{array}} * \boxed{\begin{array}{|c|c|c|} 1.0 & 0.5 & 0.0 \end{array}}$ $$= 1/2 * ( (0*1.0) + (1*0.5) + (1*0.0) ) = 0.25$$

FIG. 8

$1/2 * \boxed{\begin{array}{|c|c|c|} 0 & 1 & 1 \end{array}}^{25} \qquad 1/3 * \boxed{\begin{array}{|c|c|c|} 0 & 2 & 1 \end{array}}^{26}$ $1/5 * \boxed{\begin{array}{|c|c|c|} 1 & 2 & 2 \end{array}}^{28} \qquad 1/3 * \boxed{\begin{array}{|c|c|c|} 0 & 1 & 2 \end{array}}^{27}$ FIG. 13
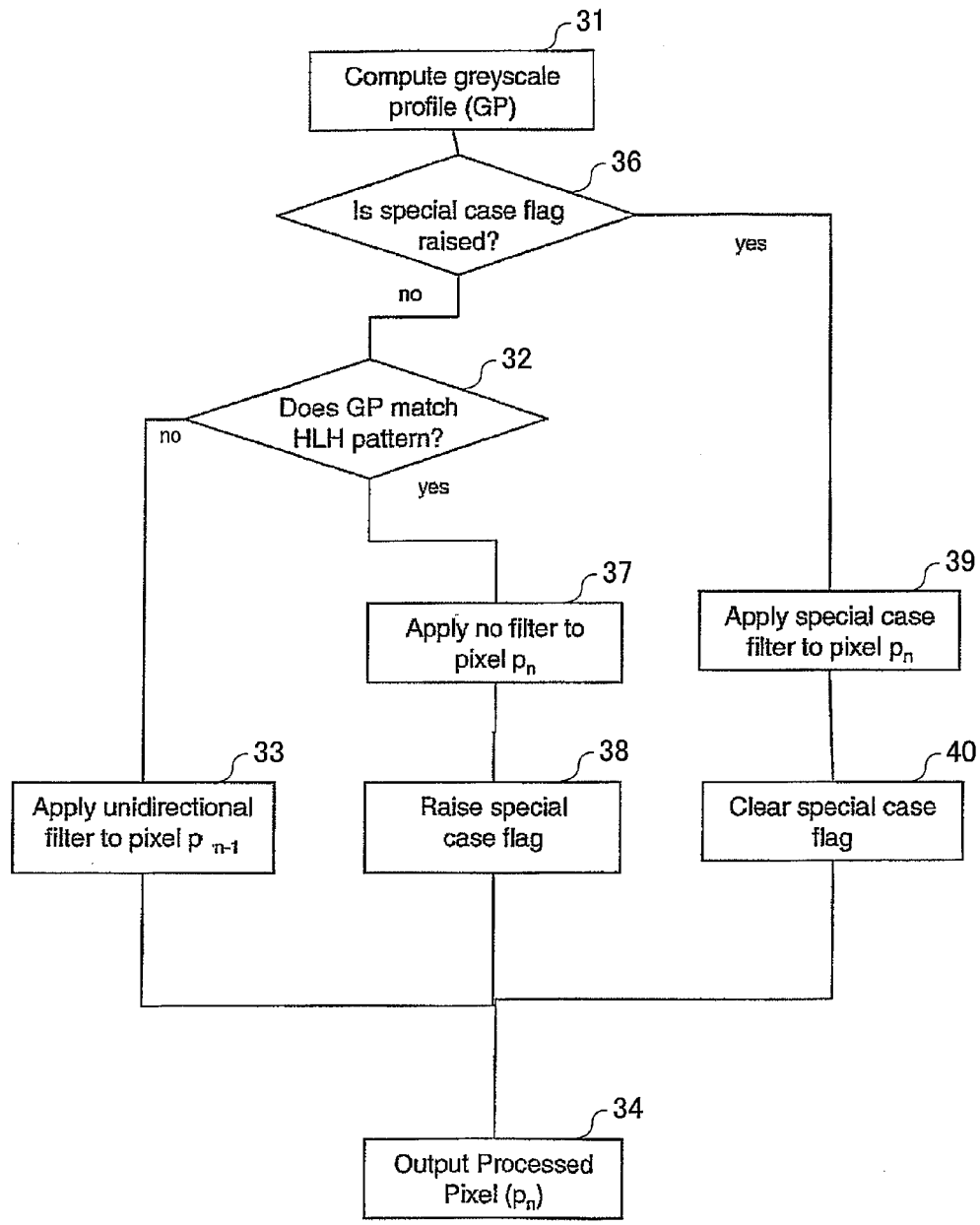
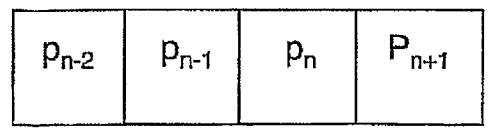

FIG. 18

$$f(p_{(x,y)}) = 1/S * \begin{bmatrix} A & B & C \\ D & E & F \\ G & H & I \end{bmatrix} * \begin{bmatrix} p_{(x-1,y-1)} & p_{(x,y-1)} & p_{(x+1,y-1)} \\ p_{(x-1,y)} & p_{(x,y)} & p_{(x+1,y)} \\ p_{(x-1,y+1)} & p_{(x,y+1)} & p_{(x+1,y+1)} \end{bmatrix}$$

$$= 1/S * ( \quad (A*p_{(x-1,y-1)}) + (B*p_{(x,y-1)}) + (C*p_{(x+1,y-1)}) +$$
$$(D*p_{(x-1,y)}) + (E*p_{(x,y)}) + (F*p_{(+1x,y)}) +$$
$$(G*p_{(x-1,y+1)}) + (H*p_{(x,y+1)}) + (I*p_{(x+1,y+1)}))$$

e.g.

$$1/8 * \begin{bmatrix} 0 & 0 & 0 \\ 0 & 3 & 2 \\ 0 & 2 & 1 \end{bmatrix} * \begin{bmatrix} 1.0 & 0.5 & 0 \\ 1.0 & 1.0 & 0.5 \\ 0.5 & 0.5 & 0 \end{bmatrix}$$

$$= 1/8 * ( \quad (0*1.0) + (0*0.5) + (0*0) +$$
$$(0*1.0) + (3*1.0) + (2*0.5) +$$
$$(0*0.5) + (2*0.5) + (1*0))$$

| 0 | 0 | 0 |
|---|---|---|
| 0 | 0.5 | 0 |
| 0 | 0.5 | 0 | f

| 0 | 0.5 | 0 |
|---|---|---|
| 0 | 0.5 | 0 |
| 0 | 0.0 | 0 | e

| 0 | 0 | 0 |
|---|---|---|
| 0 | 0.5 | 0.5 |
| 0 | 0.0 | 0 | a,b and d

| 0 | 0 | 0 |
|---|---|---|
| 0.5 | 0.5 | 0.0 |
| 0 | 0.0 | 0 | c

METHOD OF AND APPARATUS FOR PROCESSING IMAGE DATA FOR DISPLAY BY A MULTIPLE-VIEW DISPLAY DEVICE

This application is the U.S. national phase of International Application No. PCT/JP2008/051150 filed 22 Jan. 2008, which designated the U.S. and claims priority to GB Application No. 0701325.3 filed 24 Jan. 2007, the entire contents of each of which are hereby incorporated by reference.

TECHNICAL FIELD

The present invention relates to a method of and an apparatus for processing image data for display by a multiple-view display device.

BACKGROUND ART

Multiple-view displays are known for providing autostereoscopic three dimensional image display and for displaying different images in different directions for different viewers. Examples of multiple-view displays are disclosed in EP 0 829 744, GB 2 390 172 and EP 1 427 223.

WO 2006/043720 discloses a multiple-view display for use in a vehicle. A technique is disclosed for improving image quality so as to improve, for example, brightness, contrast and scale of each image.

U.S. Pat. No. 6,973,210 and US 2005/0238228 disclose a technique for mapping composite colour pixel groups to colour component pixels using lowpass filters to achieve a desired degree of luminance and colour accuracy. This technique requires a continuous three channel input signal or a discrete input which has a higher sampling frequency than is required by the output (or which has been scaled to have a higher sampling frequency than the output). Sampling of the filtered result is handled by selecting spatially different regions of the image data and mapping them to the colour component pixels rather than to the composite pixel groups.

US 2003/0210829 discloses a technique for enhancing image quality using a combination of horizontally and vertically applied highpass and lowpass filters.

US 2006/0158466 discloses an image processing technique for displaying images on a display having fewer pixels than in the original image. This technique seeks to reduce the number of driving integrated circuits required on the display.

Jinsung OH, Changhoon LEE and Younam KIM, "Minimum-Maximum Exclusive Weighted-Mean Filter with Adaptive Window", IEICE TRANS. FUNDAMENTALS, Vol. E88-A, No. 9, September 2005, pages 2451-2454 disclose an adaptive filter for removing impulse noise from corrupted images. A conditional filter is applied depending on whether noise is detected. If noise is not detected, the unprocessed pixel value is used. If noise is detected, the pixel value is replaced by a weighted sum of adjacent pixel values not affected by noise.

WO06110646A2 discloses an autostereoscopic display using a slanted lenticular component and a method of improving image quality by applying "bleed-through" and blurring. "Bleed-through" occurs when data for a pixel for a given view is also visible in a neighbouring view. This may be because the arrangement of the lenticular component is such that a pixel is physically visible in both views or, by processing the image, data from one view is overlaid on a neighbouring view, for example by a blurring operation. Furthermore the blur function used in WO06110646A2 is a standard function such as that found in Photoshop image processing software.

Many known multiple-view displays are based on a display device in the form of a spatial light modulator, such as a liquid crystal device, whose pixel structure cooperates with a parallax optic, such as a parallel barrier or a lenticular screen, to control the viewing regions from which the pixels are visible. A typical example of such an arrangement is shown in FIG. 1 of the accompanying drawings. The individual colour component pixels (sub-pixel components) receive interlaced image data from two images to provide a two-view display. The red, green and blue pixels are indicated by R, G and B, respectively. The pixels displaying the first and second images are identified by the subscripts 1 and 2. The pixel structure is aligned with slits in a parallax barrier 1 so that only those pixels $R_1$, $G_1$ and $B_1$ displaying the first image are visible to viewer 1 whereas only those pixels $R_2$, $G_2$ and $B_2$ displaying the second image are visible to viewer 2.

Some undesirable colour artefacts may become visible for certain image features and an example of this is illustrated in FIG. 1. In this example, both views contain an image feature which is one composite colour pixel group wide as illustrated at 2. The adjacent composite colour pixel groups are black as shown, for example, at 3 and 4. The displayed feature is intended to be white. However, viewer 1 sees only the green component pixel $G_1$ of this feature whereas the viewer 2 sees only the red and blue components of this feature. Thus, a feature which should appear to be white is perceived as being either green or magenta. Thus, for features such as narrow lines or "sharp" edges, incorrect colours may be perceived.

FIG. 2 of the accompanying drawings illustrates by way of example two types of parallax barrier displays. The type shown in the upper part of FIG. 2 at (a) is of the strip barrier type in which elongate slits extending throughout the height of the barrier are separated by opaque regions. The display shown at (b) in FIG. 2 has a different type of parallax barrier, in which the "slits" or apertures are arranged in a checkerboard pattern. The undesirable colour artefacts described hereinbefore can occur with either type of barrier, and with other barrier types and other types of parallax optics.

DISCLOSURE OF INVENTION

According to a first aspect of the invention, there is provided a method of processing image data for display by a multiple-view display device, comprising: receiving a plurality of sets of image pixel data, where each set represents the pixel brightness of a respective image or sequence of images; and processing the sets of pixel data by applying a unidirectional filter to each of at least one of the sets.

All of the sets may be processed by respective unidirectional filters before interleaving. The unidirectional filters may be of the same type.

Each set may comprise composite colour component pixel group data and the or each filter may operate on adjacent composite pixel groups. The or each filter may operate on the pixel data of the same colour components of the adjacent composite pixel groups.

The or each filter may form each processed pixel data as a linear combination of the unprocessed pixel data and at least one adjacent pixel data. The at least one adjacent pixel data may be one adjacent pixel data. The linear combination may be a normalised linear combination. The at least one adjacent pixel data may represent at least one horizontally adjacent pixel.

The or each filter may operate in real time.

According to a second aspect of the invention, there is provided a method of processing image data for display by a multiple-view display device, comprising: receiving a plurality of sets of image pixel data, where each set represents the pixel brightnesses of a respective image or sequence of images; processing the sets of pixel data by comparing, for each of a plurality of subsets of each of at least one of the sets where each subset represents the brightnesses of a same number of pixel groups and each pixel group comprises at least one pixel, the brightness pattern of the pixel groups of the subset with a first predetermined pattern; and, if the pixel brightness pattern substantially matches the first predetermined pattern, applying a first filter to derive a first processed brightness of at least one of the pixel groups of the subset.

The comparing step may comprise forming the difference between the brightnesses of immediately adjacent pixel groups of each subset. The comparing step may further comprise comparing the differences with at least one threshold.

Each pixel group may comprise a composite colour pixel group of colour component pixels. The brightness of each pixel group may be formed as a weighted sum of the brightnesses of the colour component pixels. As an alternative, the brightness of each pixel group may be formed as the brightness of one of the colour component pixels. The brightness of each pixel group may be formed as the brightness of a green one of the colour component pixels.

If the pixel brightness pattern does not substantially match the first predetermined pattern, a second filter may be applied to derive a second processed brightness of the at least one of the pixel groups. The second filter may be a unidirectional filter.

If the pixel brightness pattern does not substantially match the first predetermined pattern, no filter may be applied for deriving the brightness of the at least one of the pixel groups.

The method may comprise, for each of the plurality of subsets, comparing the brightness pattern of the pixel groups of the subset with a second predetermined pattern and, if the pixel brightness pattern substantially matches the second predetermined pattern, applying a third filter to derive a third processed brightness of at least one of the pixel groups of the subset.

The pixels of each subset may be contiguous and may extend substantially in one dimension.

The pixels of each subset may comprise a contiguous two dimensional arrangement.

The comparing step may be repeated following receipt of each pixel group data.

The method may comprise interleaving the processed sets for supply to the display device.

According to a third aspect of the invention, there is provided a method of processing image data for display by a multiple-view display device, comprising: receiving a plurality of sets of image pixel data, where each set represents the pixel brightnesses of a respective image or sequence of images; and processing the sets of pixel data by applying, to each pixel of each of at least one of the sets, a correction to compensate for the absence of at least one omitted adjacent pixel of the same set.

The at least one omitted adjacent pixel may be omitted during a subsequent interleaving step.

The method may comprise performing the interleaving step on the processed sets for supply to the display device.

The at least one of the sets may comprise all of the sets.

The pixels may represent grey levels of monochrome images.

The pixels may represent brightnesses of colour components and at least one omitted adjacent pixel may be of the same colour component as the pixel.

The correction may comprise replacing the pixel data with data representing a linear combination of the pixel data and at least one adjacent pixel data. The linear combination may comprise a normalised difference between: a normalised weighted sum of the pixel data and a plurality of the adjacent pixel data; and a weighted sum of the adjacent pixel data omitting the omitted adjacent pixel data. The weights of the normalised sum may be substantially in accordance with at least one Gaussian function. The at least one function may comprise a function which is rotationally symmetrical about the pixel being processed. As an alternative, the at least one function may comprise a first horizontal Gaussian function having a first standard derivation and a second vertical Gaussian function having a second standard deviation different from the first standard deviation. The first standard deviation may be less than the second standard deviation. The weights may be integer approximations to the or each Gaussian function.

The display device may be arranged to display the images or image sequences simultaneously.

The display device may be and interleaved image display device.

The display device may comprise an image display device and a parallax optic.

The sets may comprise respective serial data streams.

According to a fourth aspect of the invention, there is provided an apparatus arranged to perform a method according to the first or second or third aspect of the invention.

It is thus possible to provide techniques which allow the undesirable colour artefacts described hereinbefore to be removed or made less perceptible to a viewer. Image sharpness in the displayed images can be improved as compared with known image filtering techniques. Less processing resources are required than with the more complex known techniques of processing images. For example, processing may be performed in an application specific integrated circuit (ASIC) or in a field programmable gate array (FPGA) and less "resource" is required. For example, the processing may be performed with any one or more of: fewer gates; less memory for buffering data; less stringent timing; lower latency; and lower power consumption.

In embodiments where the actual filtering applied to the image depends on detection of one or more image features, improved perceived image quality may be obtained. For example, instead of applying a general purpose filter irrespective of the image content, the filtering may be selected according to features of image content. Perceived colour faults and image sharpness may thus be improved.

It is also possible to compensate at least partially for the visual effects of the loss of pixels which are omitted during an interleaving process.

BRIEF DESCRIPTION OF DRAWINGS

FIG. 7 is a diagram illustrating horizontal filtering of an image constituting an embodiment of the invention;

FIG. 8 is a diagram illustrating different types of filters;

FIG. 13 is a flow diagram illustrating a further conditional pixel processing technique constituting an embodiment of the invention;

FIG. 18 illustrates the use of a 3×3 filter; and

FIG. 19 illustrates examples of filter weights.

BEST MODE FOR CARRYING OUT THE INVENTION

Figure 3:
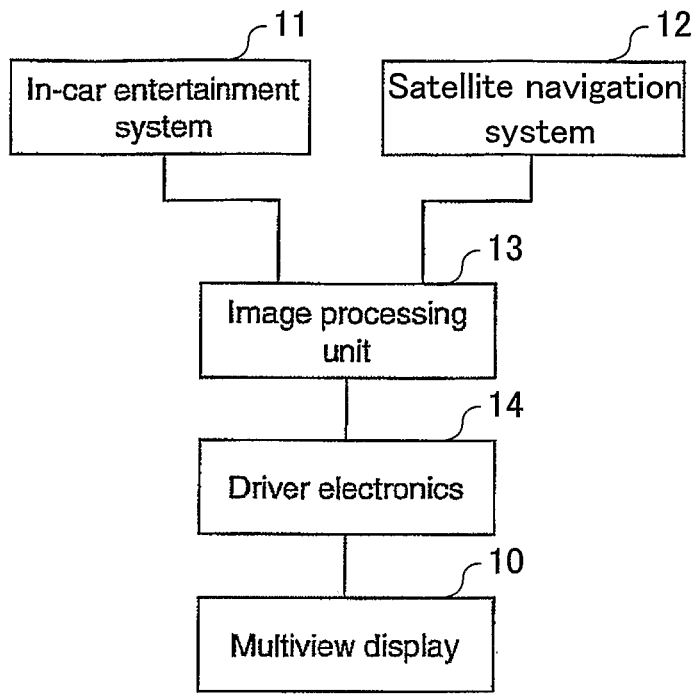
FIG. 3 is a block schematic diagram illustrating a vehicle display arrangement.

The arrangement shown in FIG. 3 comprises a multiple-view (multiview) display 10, which is mounted in the dashboard of a vehicle and provides independently selectable images or image sequences to be viewed by a vehicle driver and a front-seat passenger. The system includes an in-car entertainment system 11 which, for example, includes a DVD player for supplying entertainment images. Such images must be visible only to a passenger when the vehicle is in use but may be made available to the driver when the vehicle is not in use. The system further comprises a satellite navigation system 12 for supplying navigation images. Such images are generally required to be visible to the driver when the vehicle is in use and may be viewed by the passenger whenever the passenger wishes to view them.

The image data from the in-car entertainment system 11 and from the satellite navigation system 12 are supplied to an image processing unit 13, which performs filtering processes as described hereinafter. The unit 13 also interleaves (interlaces) the data for the two images to be viewed simultaneously by the different viewers so as to complete the image processing prior to display. The processed data are then supplied to driver electronics 14, which in turn supply the appropriate signals to the display device, such as a liquid crystal device, within the multiple-view display device 10. The display device 10 also includes a parallax barrier which, in this embodiment, has a chequerboard pattern of slits or apertures. However, any suitable slit pattern may be used, such as continuous vertical slits, and other parallax optics may be used, such as lenticular screens.

Figure 4:
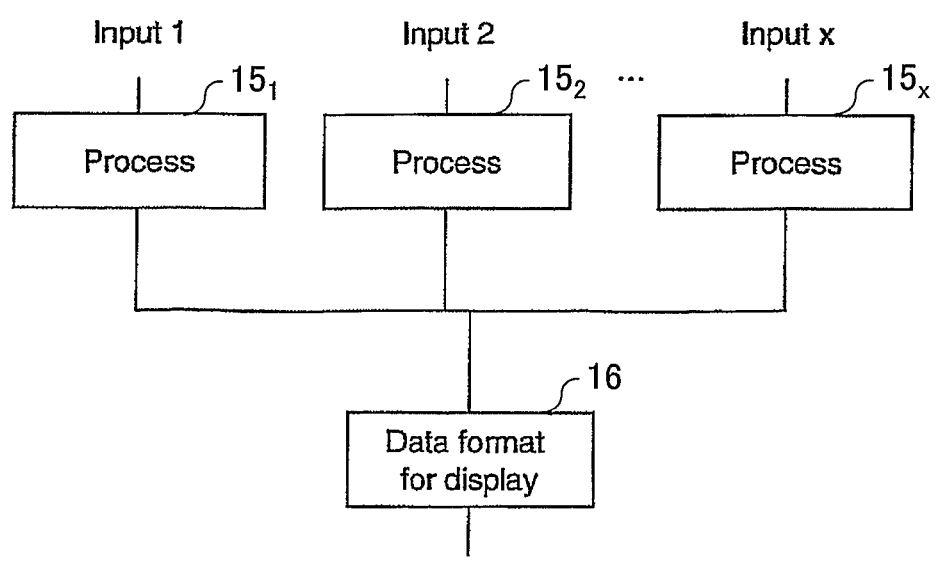
FIG. 4 is a block schematic diagram illustrating part of the arrangement of FIG. 3 in more detail.

FIG. 4 illustrates schematically the basic processing steps performed within the image processing unit 13. Processing for x images for simultaneously viewing by x viewers is illustrated. The input data for each image is individually processed in respective process steps $15_1, 15_2, \ldots, 15_x$ as described in more detail hereinafter. The data for the individually processed images are then supplied to a data formatting step 16 which formats the data into the required format for display by the display device. In particular, the step 16 performs the interleaving or interlacing so that the individual images are displayed as interleaved colour component pixels in the display device.

Figure 5:
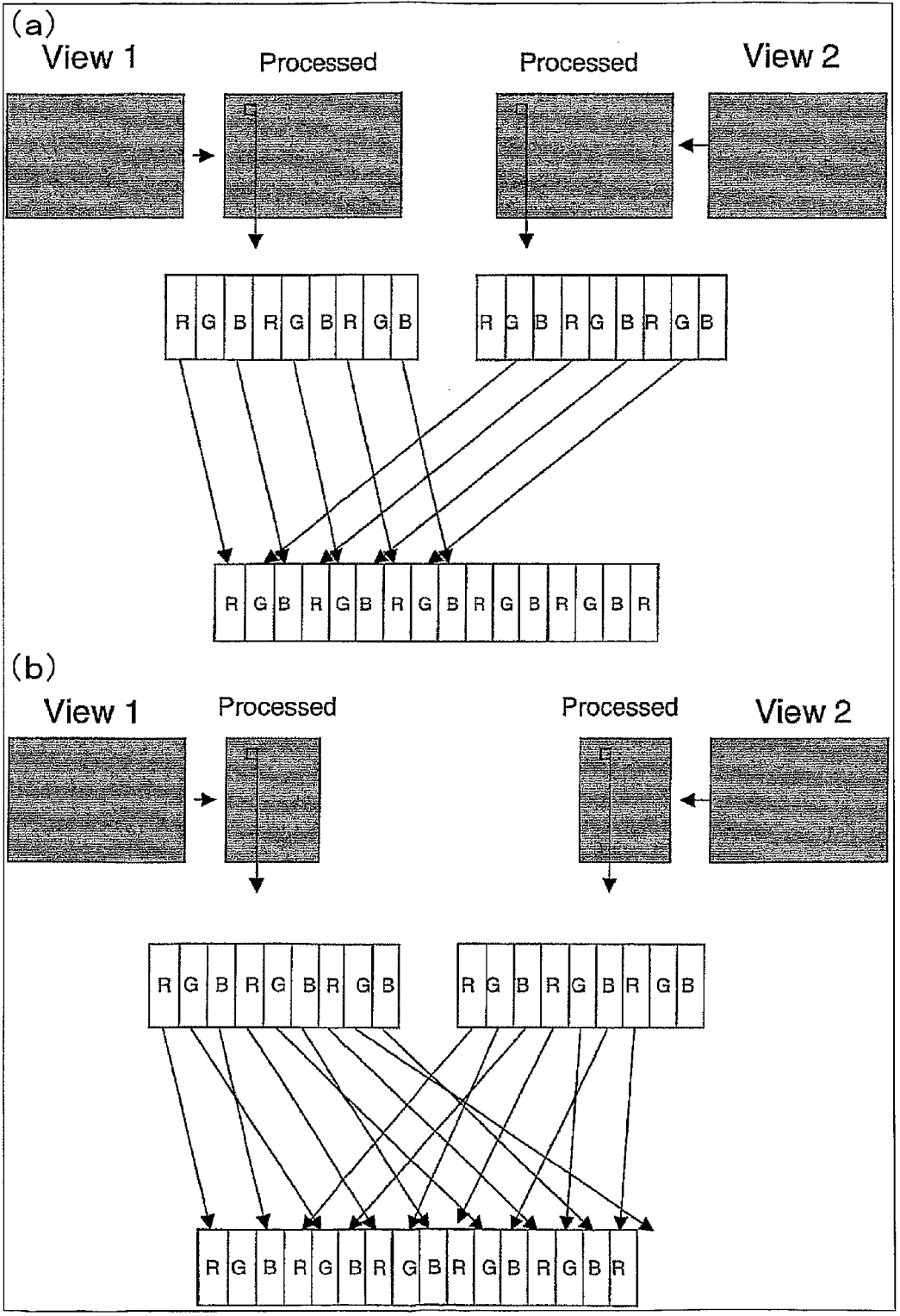
FIG. 5 illustrates at (a) and (b) different interleaving techniques for interleaving two images.

FIG. 5 illustrates two examples of interleaving the image data for two images, although any suitable type of interleaving may be used. In the example illustrated at (a), each of the images "view 1" and "view 2" is processed in the steps $15_1$ and $15_2$ such that alternate colour component pixels in each image are ignored. Thus, each image is displayed with half of its original horizontal spatial resolution.

In the interleaving technique shown at (b) in FIG. 5, the images are processed so as to reduce the horizontal resolution to half that of the original image. The resulting data for the images are then combined in the correct order for display by the display device.

The number of inputs may vary. A lower input is where all of the viewers see the same image simultaneously. Conversely, an upper limit is determined by the maximum number of images or views which the display device can display simultaneously. Processing of the images before interleaving the image data permits the best image sharpness to be provided while reducing or eliminating undesirable visible artefacts such as undesirable colour artefacts.

Figure 6:
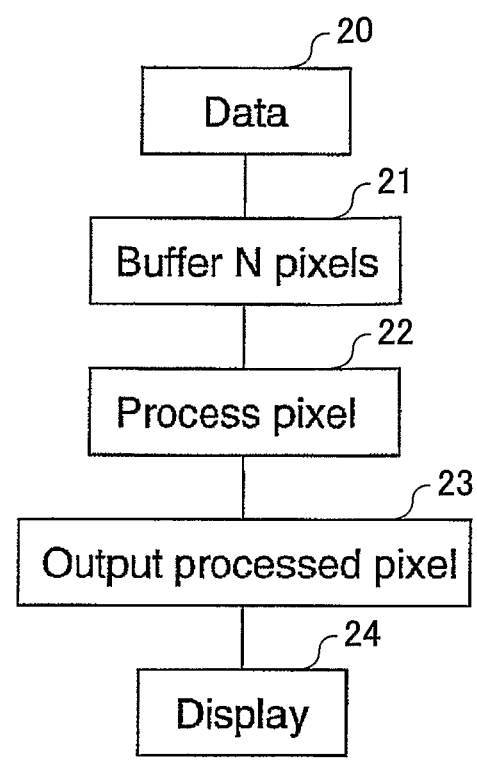
FIG. 6 is a block schematic diagram illustrating data flow through image processing in the arrangement shown in FIG. 3.

FIG. 6 illustrates the flow of data through the image processing. The image data for each view are supplied at 20, typically in serial data word format with each word representing the image data for a composite colour pixel group. Buffering is then provided at 21 for N composite colour pixels, each of which comprise red, green and blue colour component data. The number N of pixels which are required in the buffering must be sufficient to permit the subsequent processing to be performed. In order to permit the simplest filtering as described hereinafter, it is sufficient to buffer one pixel but other examples of filtering described hereinafter require sufficient buffering for more than one composite colour pixel group. The current and buffered composite colour pixel groups are then processed at 22 so as to provide processed data for one of the composite colour pixel groups and the processed pixel data are output at 23. The data are then displayed at 24, for example by refreshing the display device in accordance with its requirements.

In a set of embodiments of the invention, the pixel processing step 22 comprises applying filtering to the incoming image pixel data and FIG. 7 illustrates the type of filtering which is applied. In these embodiments, the same filter is applied to all of the pixels and is of the unidirectional type. Thus, the processed value for each pixel is a function, such as a linear combination, of the incoming values for the pixel being processed and one or more adjacent pixels forming a straight line on one side of the pixel being processed. FIG. 7 illustrates a slightly more general type of "one dimensional horizontal" filter which is such that the filter is applied to each pixel $p_{n-1}$ when the pixel $p_n$ has been received.

If the values of the horizontally adjacent pixels are represented by $p_{n-2}$, $p_{n-1}$ and $p_n$, then the processed value of the pixel $p_{n-1}$ is given by $$f(p_{n-1}) = (1/S)((A \cdot p_{n-2}) + (B \cdot p_{n-1}) + (C \cdot p_n))$$

where A, B and C are the filter coefficients and are generally constants and S performs normalising of the processed pixel value and is generally equal to (A+B+C).

Where the pixels values pi relate to single monochrome or black and white pixels, the pixel values for the three adjacent pixels are processed. However, in the case of composite colour pixel groups, each of which comprises red, green and blue pixels, the filter is applied in turn to each of the colour component pixel values of the adjacent composite pixel groups.

FIG. 7 gives an example of a unidirectional filter whose coefficients A, B and C have the values 0, 1 and 1, so that S is equal to two. The filter is applied to pixel values 1, 0.5, and 0 so that the processed value of the pixel $p_{n-1}$ is 0.25.

The same filter may be used for each of the colour components of the adjacent composite colour pixel groups but this is not essential and different filters may be applied to different colour component pixels. The example of the filter shown in FIG. 7 is unidirectional because the "leading" coefficient A is set to zero so that the processed pixel data for the pixel $p_{n-1}$ is a function of that pixel and the pixel to the right of it. Other examples of filters are given in FIG. 8. The filters shown at 25, 26 and 27 are unidirectional filters whereas the filter illustrated at 28 is not unidirectional as the value of each processed pixel is derived from the unprocessed values of that pixel and the horizontally immediately adjacent pixels on both sides.

It has been found that, for many applications, a relatively simple unidirectional filter may be applied to the image data and achieves a substantial improvement in removing or reducing the visibility of colour artefacts of the type described hereinbefore. Further, such a filter provides relatively little image blurring so that the processed images remain relatively sharp. Such a filter requires relatively little pixel buffering and processing resources and may therefore be implemented easily and with minimal penalty in terms of complexity and cost.

In another set of embodiments of the invention, improved performance is achieved by identifying one or more features in the images to be processed and applying different filtering according to the identified features. Image features may be identified by measuring the greyscale differences between neighbouring pixels forming a window around the current pixel and one or more neighbouring pixels. For example, in the simplest case, the window may be two pixels wide and one pixel high to provide a 2×1 window. The difference in greyscale between the pixels in the window is calculated and compared with one or more thresholds to determine whether the greyscale difference is "high" or "low". A single threshold may be used and the difference may be categorised as high or low depending on whether the greyscale difference is above or below the threshold. Alternatively, different thresholds may be used so that the greyscale difference has to exceed a first threshold to be categorised as high and has to be less than a second threshold, below the first threshold, to be categorised low. The categorisation may then be used to determine whether filtering is applied to the current pixel, or which of two possible filters is applied. For example, when the difference is categorised as high, a unidirectional filter of the type described hereinbefore may be applied whereas, when the difference is categorised as low, no filter is applied. Such a technique allows filtering to be applied to one side of certain edges or lines such that filtering is only applied when necessary or desirable. In this context and throughout the specification, the term "difference" refers to the absolute value or "magnitude" of the difference.

There are image features which may be processed incorrectly by applying a filter simply based on the greyscale change between neighbouring pixels. An example of such a feature is a line which is two pixels wide. Such a line will suffer from colour artefacts if a unidirectional filter is applied to it. By detecting a feature of this type, a special filter may be applied in place of, for example, a unidirectional filter which is applied elsewhere.

Another example of an image feature which should be detected is a line which is a single pixel wide.

Figure 10:
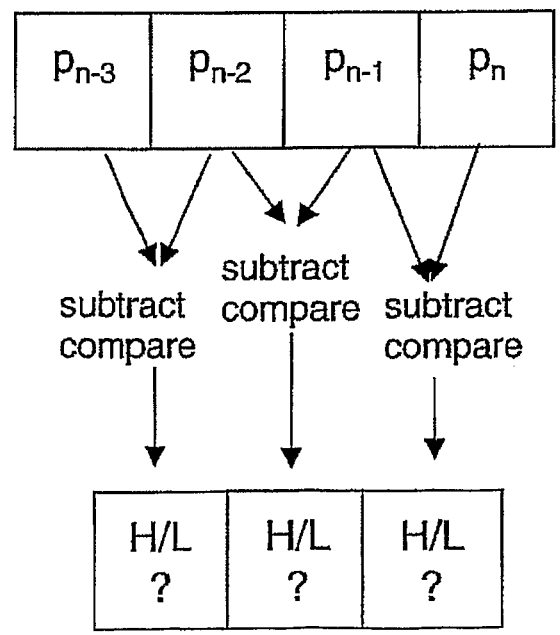
FIG. 10 is a diagram illustrating the determining of a greyscale profile for a 4×1 window.

By using a 4×1 window, features such as two pixel wide lines can be detected with good reliability so that the appropriate "conditional filtering" may be applied. As illustrated in FIG. 10, four horizontally adjacent pixels including the pixel $p_{n-1}$ currently being processed are assessed by performing a subtraction of pixel values for immediately adjacent pairs of pixels and then performing the comparison as described hereinbefore to determine a high (H) or low (L) greyscale difference. Thus, an intensity profile may be determined as a sequence where each element comprises H or L. A two pixel wide line will then be indicated by the intensity profile HLH.

Figure 9:
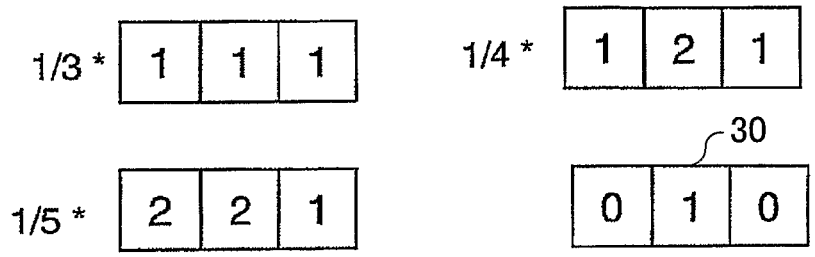
FIG. 9 is a diagram illustrating further filter types.

FIG. 9 gives some examples of "special case" filters which may be used, including the filtering coefficients shown at 30 for no filtering. By testing for intensity profile patterns corresponding to specific features, choices may be made about whether to apply a filter to the current pixel and, if so, which of a plurality of available filters should be applied.

Figure 11:
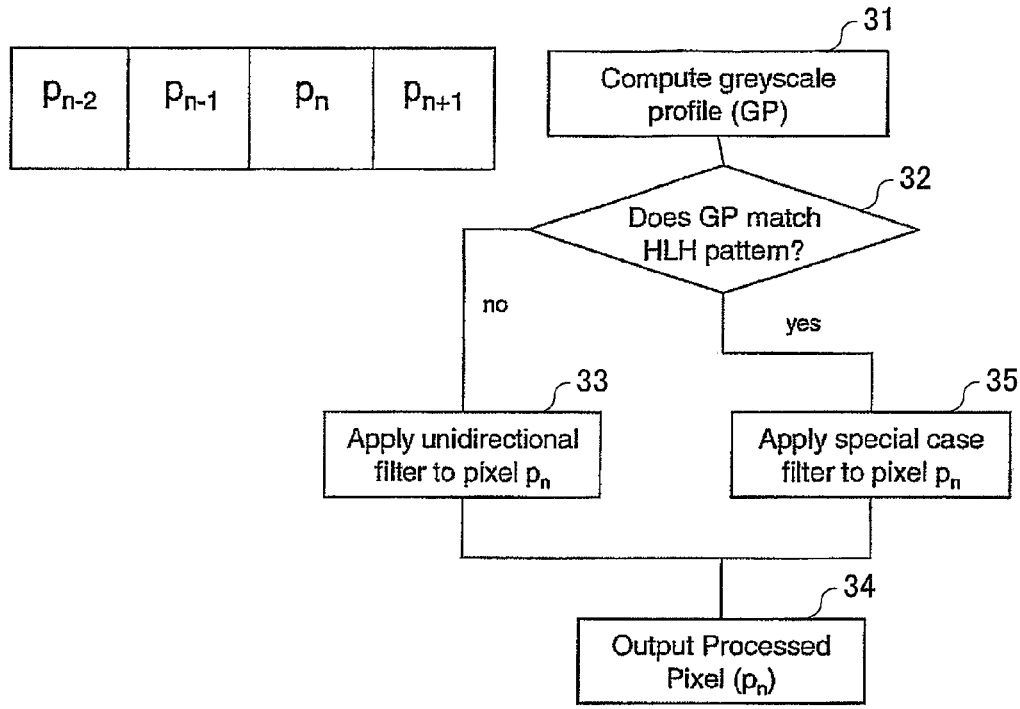
FIG. 11 is a flow diagram illustrating a conditional pixel processing technique constituting an embodiment of the invention.

FIG. 11 illustrates an example of conditional processing for the current pixel $p_n$ based on a 4×1 window. When the next pixel $p_{n+1}$ is received, the difference profile is determined in a step 31 and a step 32 determines whether this matches the HLH pattern indicative of a two pixel wide line. If not, then a step 33 applies a unidirectional filter to the current pixel and the processed pixel value, or set of values, is output at 34. Conversely, if a match is found, then a special case filter is applied and the resulting processed data are output by the steps 35 and 34. In this particular example, once a two pixel wide line has been identified, the unidirectional filter has already been applied to the left hand edge, so that a special case filter is applied to the right hand edge of the line. It is thus possible to avoid adding or creating an undesirable colour artefact to the perceived image.

Figure 12:
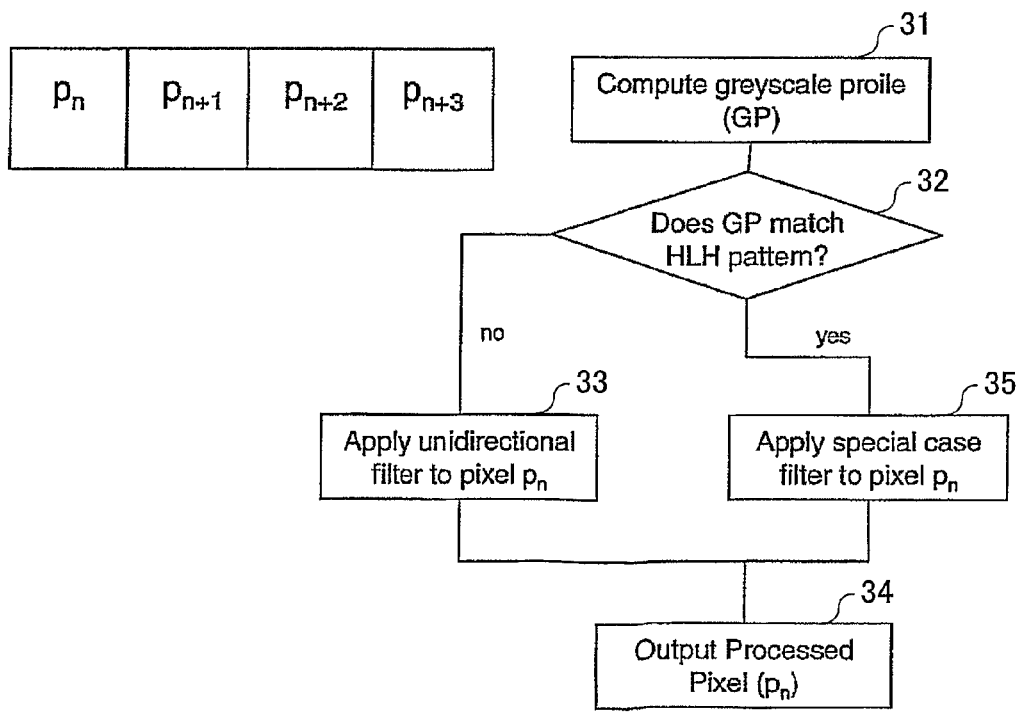
FIG. 12 is a flow diagram illustrating another conditional pixel processing technique constituting an embodiment of the invention.

The conditional processing illustrated in FIG. 12 is similar to that illustrated in FIG. 11, except that a special case filter is applied to the left hand edge of a two pixel wide line. The unidirectional filter is then applied to the right hand edge of the line.

FIG. 13 illustrates conditional processing such that a special case filter is applied to the pixel after the right hand edge of the feature. The grey scale profile is determined in the step 31 and a step 36 determines whether a special flag is raised. If not, the step 32 determines whether the grey scale profile matches the HLH pattern. If not, the unidirectional filter is applied to the pixel $p_{n-1}$ in the step 33. Otherwise, no filter is applied to the pixel $p_n$ in a step 37 but a special flag is raised in a step 38.

When the step 36 determines that the special flag is raised, a special case filter is applied to the pixel $p_n$ in a step 39. The special flag is then cleared in a step 40. Thus, when a two pixel wide line is identified, a unidirectional filter is applied to the left hand edge, no filter is applied to the line itself, and a special case filter is applied to the pixel after the right hand edge.

Figure 14:
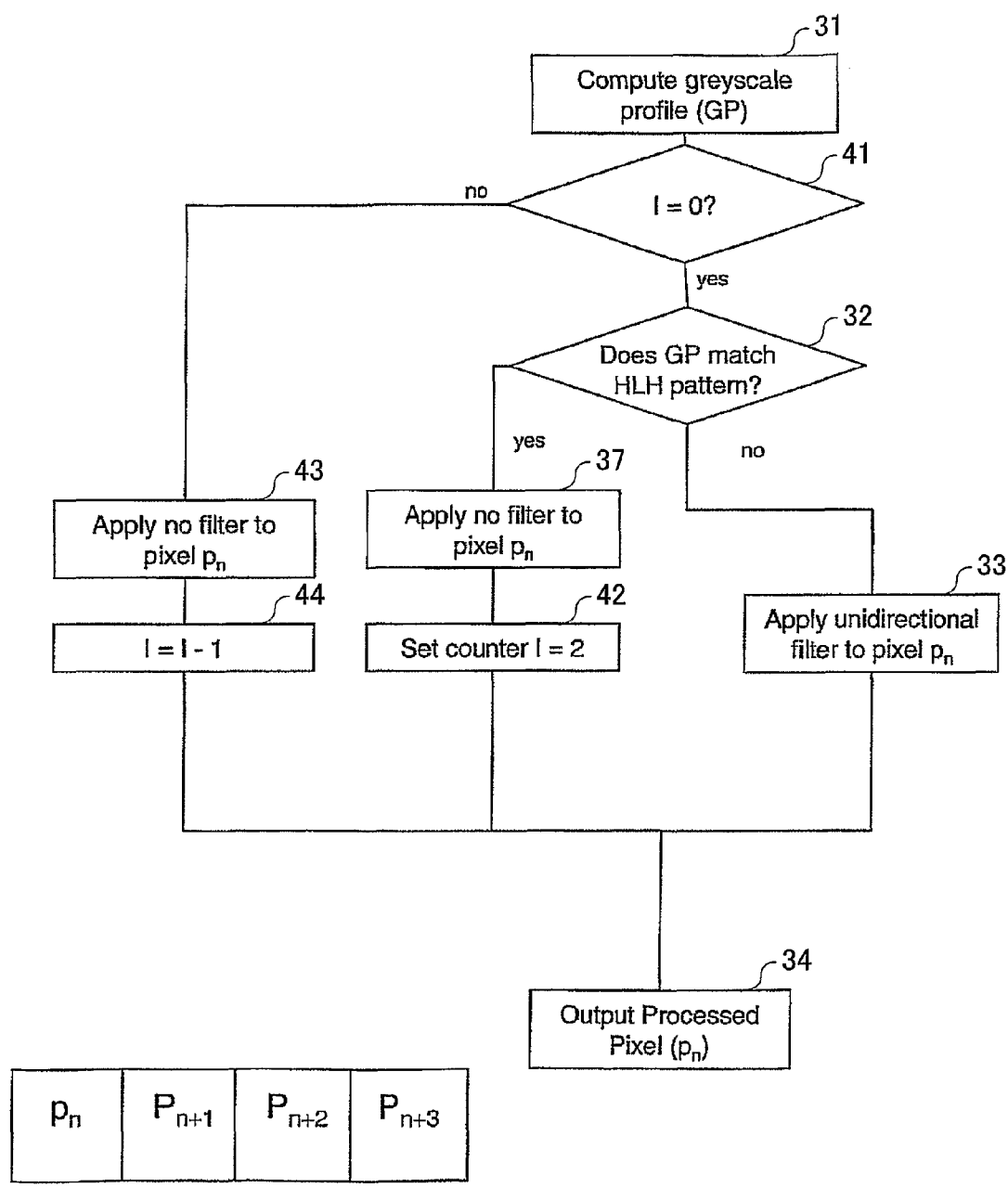
FIG. 14 is a flow diagram illustrating yet another conditional pixel processing technique constituting an embodiment of the invention.

FIG. 14 illustrates conditional processing such that no processing takes place around the identified feature. The current pixel to be processed is at the left hand end of the 4×1 window.

After determining the greyscale profile, a step 41 determines whether a counter value I is equal to zero. If not, the step 43 applies no filter to the current pixel and a step 44 decrements the counter value by one. When the step 41 determines that the counter value I is equal to zero, the step 32 determines whether the greyscale profile matches the HLH pattern representing a two bit wide line. If so, a step 37 applies no filter and a step 42 sets the counter value I equal to 2. If there is no match in the step 32, a unidirectional filter is applied in the step 33.

Thus, when the HLH pattern is detected in the grey scale profile, no filter is applied but the counter is set to 2. As the next two pixels are processed, the counter has a non-zero value so that no filter is applied to either of these pixels. When the next pixel arrives, the counter has returned to zero so that a unidirectional filter is applied as normal.

Figure 15:
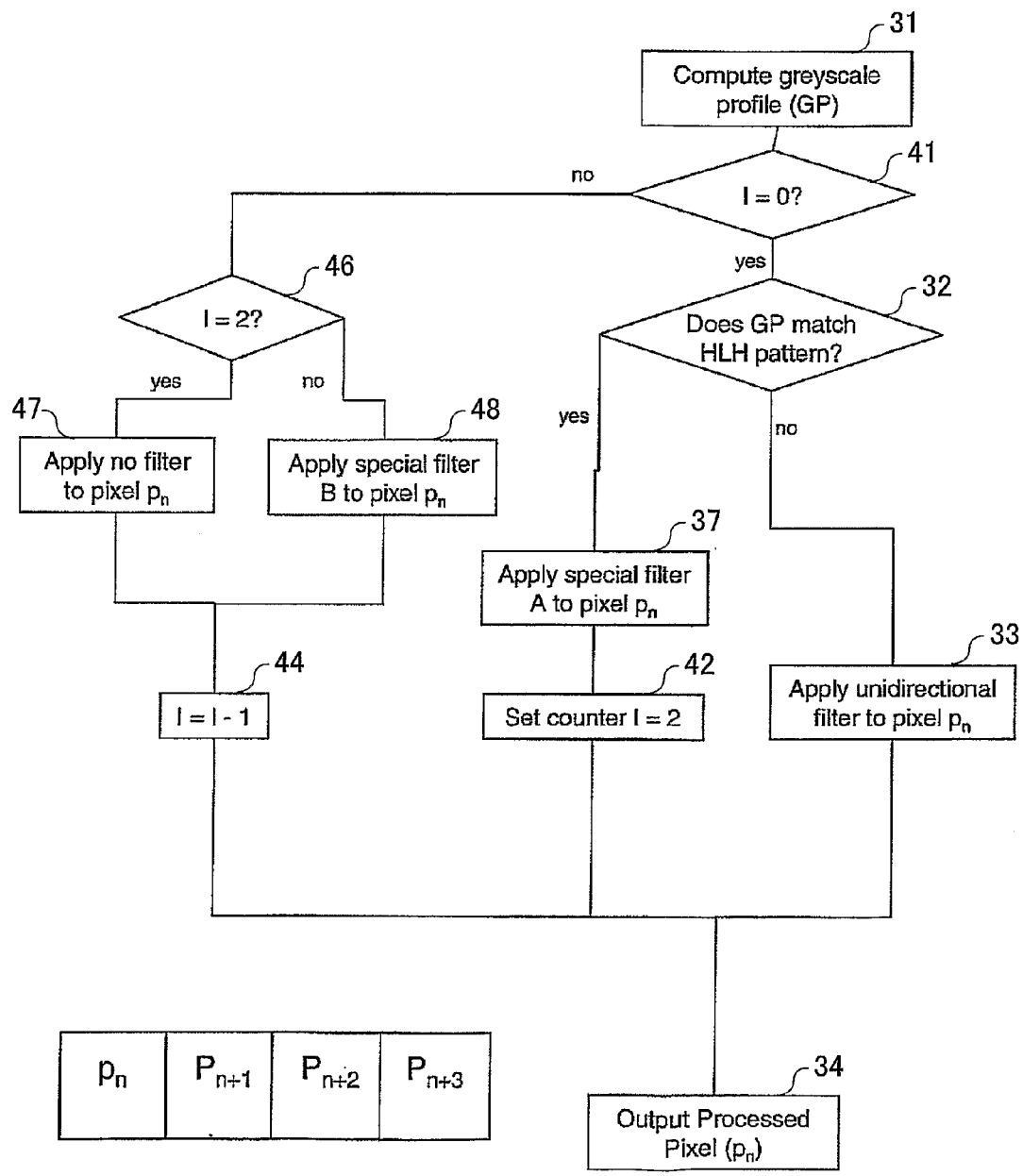
FIG. 15 is a flow diagram illustrating yet a further conditional pixel processing technique constituting an embodiment of the invention.

The conditional processing illustrated in FIG. 15 differs from that illustrated in FIG. 14 in that special case filters are applied to both sides of the two pixel wide line. Thus, the steps 41, 32, 33, 27 and 42 are substantially the same as the corresponding steps in FIG. 14 expect that the step 37 applies a first special filter A to the pixel $p_n$.

When the step 41 determines that the counter value I is not equal to zero, a step 46 determines whether I is equal to 2. If not, then another special filter B is applied to the pixel $p_n$ in the step 48. If I is equal to 2, then no filter is applied by the step 47. In either case, the step 44 decrements the counter value by 1. Thus the special filter A is applied to the left hand edge of the two pixel wide line, the special filter B is applied to the right hand edge of the line, no filtering is applied to the line itself and a unidirectional filter is applied elsewhere.

Other window sizes may be applied around the current pixel, for example so as to detect other image features which may require different processing. Test windows may extend vertically as well as or instead of horizontally and examples of window sizes which may be used are 2×1, 1×2, 2×2 and 3×3.

Figure 16:
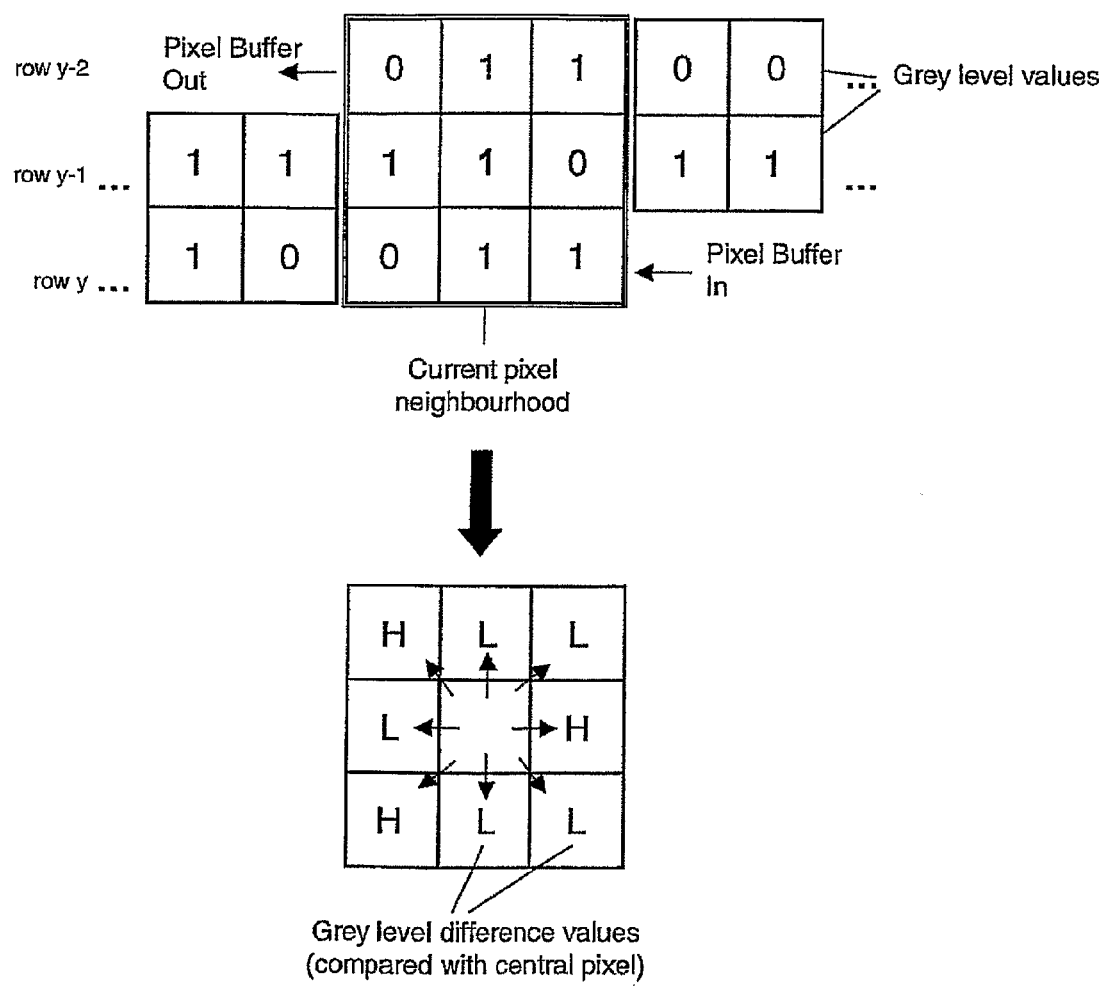
FIG. 16 is a diagram illustrating processing using a 3×3 window.

An example of a "square" window which is 3 pixels wide and 3 pixels high is illustrated in FIG. 16 with the current pixel being disposed at the centre position of the window.

Figure 17:
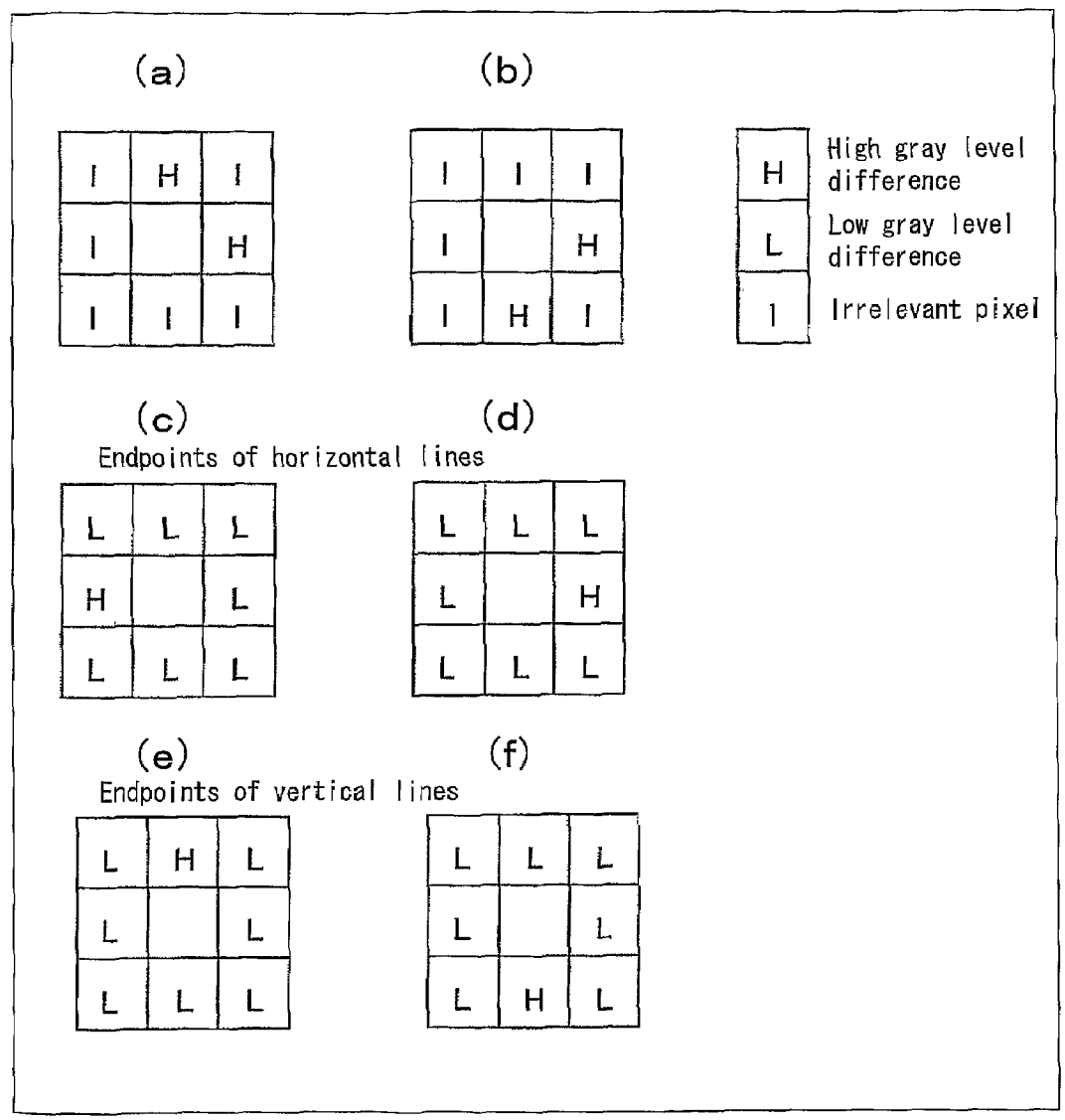
FIG. 17 illustrates window profiles for various image features.

The greyscale difference profile in this example is evaluated by comparing the grey level difference between the current pixel and each of the surrounding pixels. A specific example of such a profile for exemplary pixel values is illustrated in FIG. 16. The resulting profile is then compared against a set of profiles to determine the presence of a particular image feature and an example of a set of such profiles is illustrated in FIG. 17. The values H and L are as described hereinbefore but a value I is assigned to any pixel where its value is irrelevant to the test for the image feature. Thus, the patterns shown at (a) and (b) allow diagonal lines to be identified, the patterns shown at (c) and (d) allow end points of horizontal lines to be identified and the patterns shown at (e) and (f) allow end points of vertical lines to be identified.

As before, a filter may be applied to the pixels in the window by applying weights to each pixel, summing the results and normalising. This is illustrated in the upper part of FIG. 18 and a specific example is illustrated in the lower part for actual values of the filter parameters and the pixels in the window. A different filter may be associated with each test pattern so as to provide improved quality of image processing. Specific examples of such filters are illustrated in FIG. 19. Thus, the filter f in FIG. 19 may be applied if the profile matches the test pattern shown at f) in FIG. 17, the filter e may be applied for the test pattern e), the filter c may be applied for the test pattern c), and the bottom left filter in FIG. 19 may be applied for the remaining test patterns a), b) and d).

In order to make use of these test patterns, it is necessary to buffer a larger number of pixels so that all of the window pixels are available for each current pixel being processed. Thus, in the case of the 3×3 window, just over two rows of pixel data are required to be buffered in order for the processing to be performed.

It is possible to reduce the number of calculations which have to be performed for processing each pixel by storing some results from previous pixel processing. For example, the greyscale difference between pixels of each pair is constant for the current image so that the H or L values for previous pixel pairs may be stored for subsequent use. In the example of the 4×1 window, the most recent two results may be stored so that only one pixel difference calculation is required when processing each new pixel. In the case of the 3×3 window, four results may be stored for each pixel. Four new results then have to be calculated for each new pixel to be processed instead of calculating eight results. Thus, by storing previous results, there is an increase in memory requirements but a decrease in processing requirements.

As mentioned hereinbefore, different threshold values may be used to determine the H and L values of greyscale differences. For example, the high threshold may be 0.3 whereas the low threshold may be 0.1 for a comparison range from 0 to 1.

The greyscale difference threshold testing described hereinbefore may be performed in various ways for colour displays where each composite colour pixel group comprises different colour component pixels such as red, green and blue. In one example, the red, green and blue data are converted to a single greyscale value using standard weighting before performing the comparisons between full-colour pixel groups. In another example, the red, green and blue values are separately compared with thresholds weighted by an amounted related to the weighting used for red, green or blue when converted to greyscale. In a further example, the red, green and blue data may be converted to single greyscale values using weightings suitable for hardware implementation, for example employing multiplication or division by powers of 2, after which the resulting greyscales are compared. In yet another example, a single colour component may be used to represent the full-colour pixel group grey level. For example, the green colour component may be used to represent the grey level as green is generally the dominant colour component and makes the largest contribution to the greyscale equivalent of a full-colour pixel group.

Another undesirable visual artefact occurs in some types of multiple-view displays because of the interleaving process. In particular, the perceived brightness of each pixel is influenced by the brightnesses of adjacent pixels.

When the pixel data for the different images or sequences of images are interleaved for display on the display device, each pixel is surrounded by fewer visible sub-pixels than in the original image before processing and interleaving. In the absence of any correction for this effect, the pixel appears different to a human observer than is intended. In order to overcome or reduce this effect, a correction is applied to each pixel as follows.

The appearance of a pixel is influenced by the appearance of the adjacent or surrounding pixels in the original image and the pixel appearance as perceived by a human observer is determined by summing the weighted contributions of the pixel and its neighbours. In the case where the display provides monochrome or black-and-white images, all of the pixels within a window contribute to the weighted sum. In the case of a full-colour display or the like comprising colour composite pixel groups of different colour component pixels, only those sub-pixels of the same colour are considered within the window.

In a typical example, a window comprising three rows and three columns of pixels is centred on the pixel being processed. For example, each colour component of a composite colour pixel group may be processed in turn and, for the red colour component pixel $V_{x,y}$, the eight immediately adjacent red component pixels are within the window. The actual appearance or brightness $V_r$ of the pixel $V_{x,y}$ is obtained by a linear combination of the contributions of the pixels within the window in the form of a weighted sum as follows:

$$V_r = \sum \begin{Bmatrix} w_1 * V_{x-1,y-1} & w_{2a} * V_{x,y-1} & w_1 * V_{x+1,y-1} \\ w_{2b} * V_{x-1,y} & w_3 * V_{x,y} & w_{2b} * V_{x+1,y} \\ w_1 * V_{x-1,y+1} & w_{2a} * V_{x,y+1} & w_1 * V_{x+1,y+1} \end{Bmatrix}$$

where the contribution of the pixel being processed is weighted by a weight w3, the contributions of the vertically adjacent pixels $V_{x,y-1}$ and $V_{x,y+1}$ are weighted with a weight $w_{2a}$, the contributions of the horizontally adjacent pixels $V_{x-1,y}$ and $V_{x+1,y}$ are weighted with a weight $w_{2b}$, the diagonally adjacent pixels $V_{x-1,y-1}$, $V_{x+1,y-1}$, $V_{x-1,y+1}$ and $V_{x+1,y+1}$ are weighted with a weight $w_1$, the contributions within the brackets are summed to form the linear combination or weighted sum, and the relative positions of the pixel in the image are as illustrated within the brackets.

Figure 1:
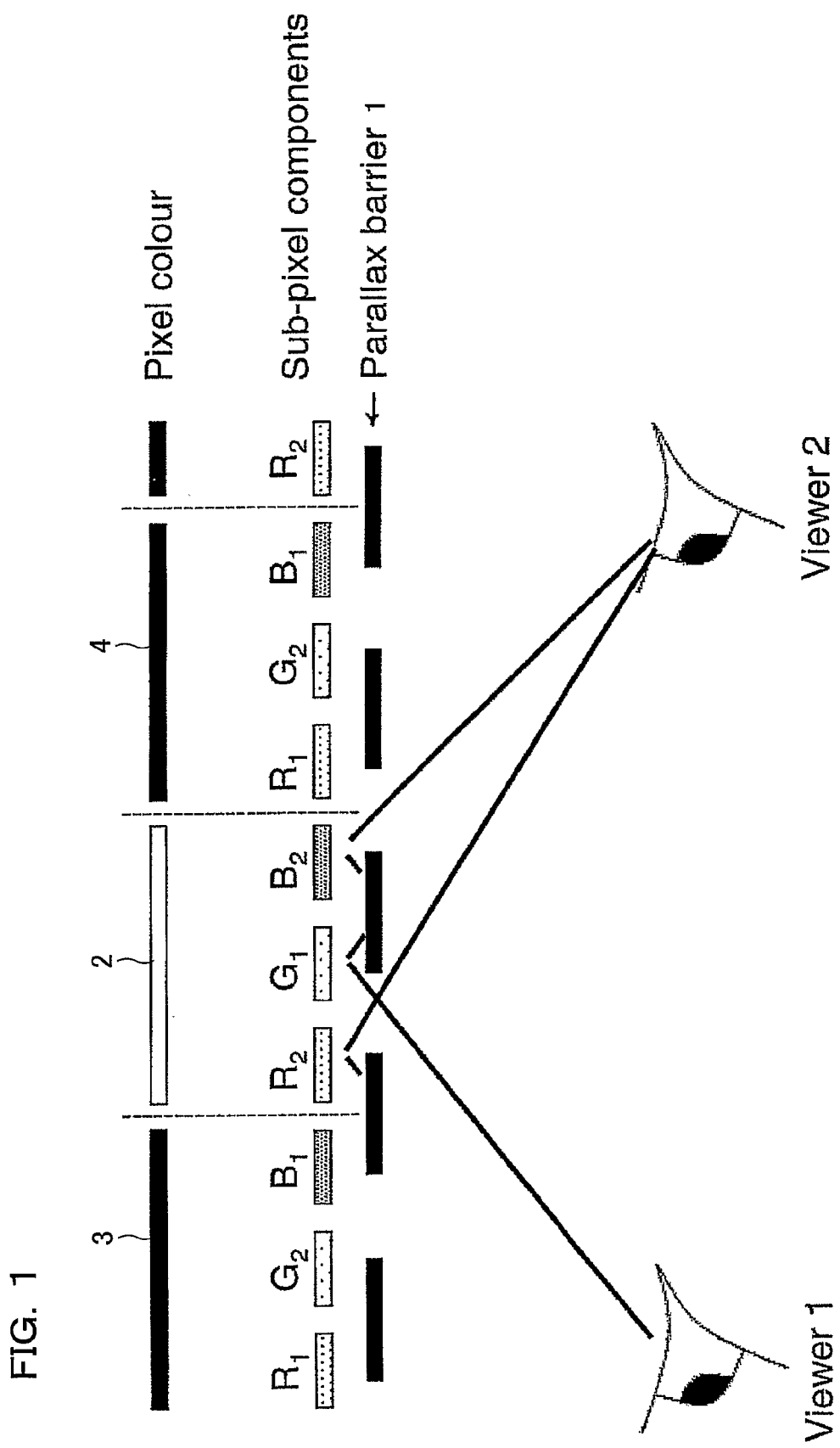
FIG. 1 is a schematic cross-sectional diagram illustrating a known type of multiple-view display.
Figure 2:
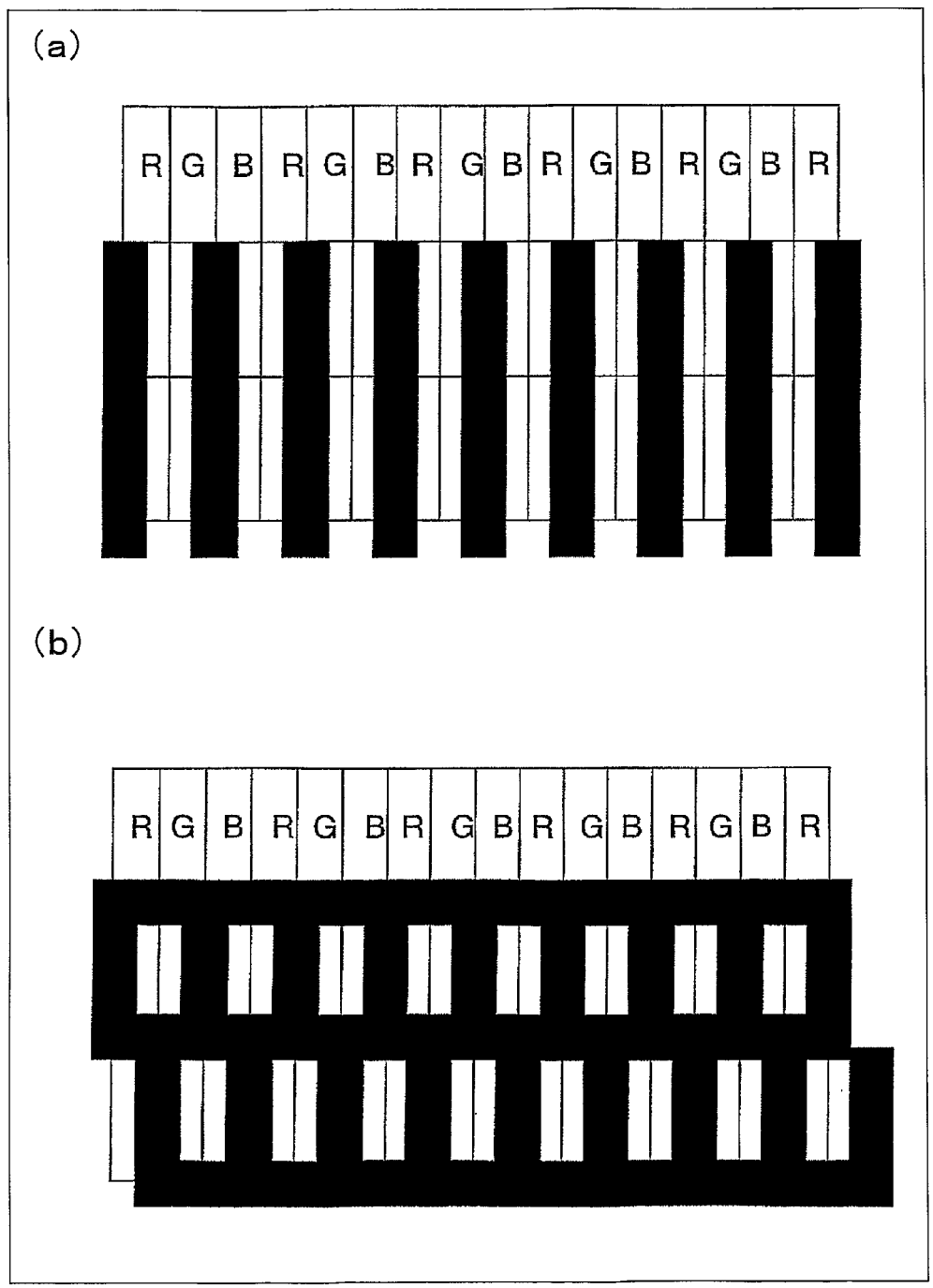
FIG. 2 is a diagrammatic view illustrating different types of parallax barriers.

After the image interleaving process to form a spatially multiplexed composite image on the display device, several of the pixels are omitted from the window in a pattern corresponding to, for example, the pattern of parallax elements such as apertures in a parallax optic such as a parallax barrier. For example, in the case where a checker barrier of the type shown at (b) in FIG. 2 is used, the horizontally and vertically adjacent pixels are omitted in the interleaving process and therefore do not contribute to the appearance of the pixel $V_{x,y}$ when the multiple-view display is viewed by a human observer. Instead, the appearance $V_p$ of the pixel $V_{x,y}$ to someone observing the pixel on the multiple-view display device is given by:

$$V_p = W * \sum \begin{Bmatrix} w_1 * V_{x-1,y-1} & & w_1 * V_{x+1,y-1} \\ & w_3 * V_{x,y} & \\ w_1 * V_{x-1,y+1} & & w_1 * V_{x+1,y+1} \end{Bmatrix}$$

where $W = (4w_1 + 2*w_{2a} + 2*w_{2b} + w_3)/(4*w_1 + w_3)$

In order for the pixel to appear as intended, its data or value is corrected to a new value $V'_{x,y}$ so as to give the perceived appearance $V_r$. The corrected value is then found from the following equation:

$$\sum \begin{Bmatrix} w_1 * V_{x-1,y-1} & w_{2a} * V_{x,y-1} & w_1 * V_{x+1,y-1} \\ w_{2b} * V_{x-1,y} & w_3 * V_{x,y} & w_{2b} * V_{x+1,y} \\ w_1 * V_{x-1,y+1} & w_{2a} * V_{x,y+1} & w_1 * V_{x+1,y+1} \end{Bmatrix} = $$

$$W * \sum \begin{Bmatrix} w_1 * V_{x-1,y-1} & & w_1 * V_{x+1,y-1} \\ & w_3 * V'_{x,y} & \\ w_1 * V_{x-1,y+1} & & w_1 * V_{x+1,y+1} \end{Bmatrix}$$

This equation is solved for $V'_{x,y}$ to give:

$$V'_{x,y} = \frac{1}{w3} \left\{ \frac{1}{W} \sum \begin{Bmatrix} w_1 * V_{x-1,y-1} & w_{2a} * V_{x,y-1} & w_1 * V_{x+1,y-1} \\ w_{2b} * V_{x-1,y} & w_3 * V_{x,y} & w_{2b} * V_{x+1,y} \\ w_1 * V_{x-1,y+1} & w_{2a} * V_{x,y+1} & w_1 * V_{x+1,y+1} \end{Bmatrix} - \right.$$

$$\left. \sum \begin{Bmatrix} w_1 * V_{x-1,y-1} & w_1 * V_{x+1,y-1} \\ w_1 * V_{x-1,y+1} & w_1 * V_{x+1,y+1} \end{Bmatrix} \right\}$$

so as to give the corrected brightness or grey level for the pixel being processed. By applying this to each pixel of the original images before interleaving (with or without the further processing described hereinbefore), it is possible to compensate for the pixels which are omitted by the interleaving process. Although these pixels are replaced by pixels corresponding to another image or sequence, such other pixels are obscured by the parallax optic and do not, therefore, contribute to the appearance of the pixel being processed.

The weights $w_1$, $w_{2a}$, $w_{2b}$ and $w_3$ are chosen so as to provide the appropriate correction or compensation for the "missing" pixels. In a typical example, the weights are chosen according to a Gaussian function of distance on the display device from the pixel being processed. For example, the weights may have the following values:

$w_1 = 0.0240$, $w_{2a} = w_{2b} = 0.1070$, $w_3 = 0.4759$

These weights are appropriate for a rotationally symmetrical Gaussian function centred on the pixel being processed for equal vertical and horizontal spacing of the pixels on the display device.

Although these weights have been found to provide good quality results, the processing requires multiplication operations and is relatively expensive in terms of hardware. Acceptable results may be achieved by choosing integer values of the weights so as to approximate the Gaussian function, requiring only shift, add and subtract operations to be performed. An example of suitable integer weights is as follows:

$w_1 = 1$, $w_{2a} = w_{2b} = 2$, $w_3 = 4$

In another example of integer approximations to Gaussian functions, vertical and horizontal Gaussian functions of different standard deviations may be used. An example of suitable integer value weightings is as follows:

$w_1 = 1$, $w_{2a} = 8$, $w_{2b} = 2$, $w_3 = 16$

In this case, the standard deviation of the horizontal Gaussian function is less than that of the vertical Gaussian function. This allows a different compromise between smoothing and correction of the visual artefact to be provided in the two orthogonal axes. This smoothing and correction takes advantage of the tendency of the human eye to be more sensitive to resolution in the horizontal direction than in the vertical direction.

The above processing may be performed for every pixel irrespective of the values of $V_p$ and $V_r$. Alternatively, processing may depend on the values of $V_p$ and $V_r$. For example, if the absolute value $|V_r - V_p|$ of the difference between $V_p$ and $V_r$ is greater than a predetermined threshold, the processed value may be used whereas, otherwise, the unprocessed value may be used.

The techniques described hereinbefore may be implemented in software used to control a programmable data processor for performing the processing methods. Alternatively, the processing may be implemented in hardware, for example for processing an image data stream as it is supplied to the display device.

Another example of the use of a multiple view display is to provide a display which may be operated in a public viewing mode or in a private viewing mode. In the public viewing mode, the display is required to display the same image or image sequence throughout a relatively wide viewing range, for example so that the display may be viewed by several viewers simultaneously. However, when switched to the private mode, the viewing range for the intended viewer is made relatively narrow so that the image or image sequence being displayed cannot be viewed by anyone else. The multiple view displays described hereinbefore may be used for this purpose.

In the public mode, the same image or image sequence is displayed by all of the pixels so as to provide the wide viewing range. The processing techniques described hereinbefore are applied so as to improve the image quality perceived by all of the viewers.

In the private mode, two or more different images are displayed. The private image is displayed by one of the sets of pixels so as to be viewable in a relatively narrow viewing range, for example by an authorised viewer. The other set or sets of pixels provide a different image display. For example, the other set or sets of pixels may display a black image or an obscuring pattern which helps to hide the private image or image sequence so as to make it imperceptible to non-authorised viewers. However, other images may be displayed such as pictures, text or images of a uniform colour or uniform brightness.

GB2428101 discloses a technique for producing a privacy effect in an LCD display by imposing a degree of high frequency variation (a secondary image) on a source image (principal image). The secondary image is used to modulate the vaccination imposed on the principal image to achieve the privacy effect. For example, the variation may be on a regular gird pattern similar to that produced by a parallax barrier in other types of display. The variation imposed on the image may create the same colour artefacts as found in other multiple-view displays, for example as described hereinbefore. By processing the principle image using the techniques described hereinbefore, the colour artefacts may be substantially corrected.

The invention claimed is:

1. A method of processing image data for display by a multiple-view display device, the method comprising:
   receiving a plurality of sets of image pixel data, where each set represents the pixel brightnesses of a respective image or sequence of images; and
   processing the sets of image pixel data by applying, to each pixel of each of at least one of the sets, a correction to compensate for the absence of at least one omitted adjacent pixel of the same set caused by the at least one of the sets having undergone image interleaving, wherein
   the correction processes a pixel in at least one of the sets by using (i) a first set of coefficient data derived from pixels surrounding said pixel in the at least one of the sets before interleaving has been performed and (ii) a second set of coefficient data derived from pixels surrounding said pixel other than the omitted adjacent pixel in the at least one of the sets after image interleaving has been performed, wherein
   in the first set, the correction process assigns a weighting factor to the adjacent pixels of said pixel which are to be omitted after image interleaving has been performed according to a Gaussian function of distance from said pixel.

2. A method as claimed in claim 1, in which the at least one omitted adjacent pixel is omitted during a subsequent interleaving step.

3. A method as claimed in claim 2, comprising performing the interleaving step on the processed sets for supply to the display device.

4. A method as claimed in claim 1, in which the at least one of the sets comprises all of the sets.

5. A method as claimed in clam 1, in which the pixels represent grey levels of monochrome images.

6. A method as claimed in claim 1, in which the pixels represent brightnesses of color components and at least one omitted adjacent pixel is of the same color component as the pixel.

7. A method as claimed in claim 1, in which the correction comprises replacing the pixel data with data representing a linear combination of the pixel data and at least one adjacent pixel data.

8. A method as claimed in claim 7, in which the linear combination comprises a normalized difference between: a normalized weighted sum of the pixel data and a plurality of the adjacent pixel data; and a weighted sum of the adjacent pixel data omitting the omitted adjacent pixel data.

9. A method as claimed in claim 8, in which the weights of the normalized sum are substantially in accordance with at least one Gaussian function.

10. A method as claimed in claim 9, in which the at least one function comprises a function which is rotationally symmetrical about the pixel being processed.

11. A method as claimed in claim 9, in which the at least one function comprises a first horizontal Gaussian function having a first standard derivation and a second vertical Gaussian function having a second standard deviation different from the first standard deviation.

12. A method as claimed in claim 11, in which the first standard deviation is less than the second standard deviation.

13. A method as claimed in claim 9, in which the weights are integer approximations to the or each Gaussian function.

14. A method as claimed in claim 1, in which the display device is arranged to display the images or image sequences simultaneously.

15. A method as claimed in claim 1, in which the display device is an interleaved image display device.

16. A method as claimed in claim 1, in which the display device comprise an image display device and a parallax optic.

17. A method as claimed in claim 1, in which the sets comprise respective serial data streams.

18. An apparatus arranged to perform a method as claimed in claim 1.

19. A method of processing image data for display by a multiple-view display device, the method comprising:
   receiving a plurality of sets of image pixel data, where each set represents the pixel brightness of a respective image or sequence of images; and
   processing at least one of the plurality of sets of image pixel data by applying a unidirectional filter, wherein
   the unidirectional filter processes pixels only on one side of the processed pixel, and
   the unidirectional filter is always applied to the at least one of the plurality of sets of image pixel data regardless of the respective image or the sequence of images.

20. A method as claimed in claim 19, in which all of the sets are processed by respective unidirectional filters before interleaving.

21. A method as claimed in claim 20, in which the unidirectional filters are of the same type.

22. A method as claimed in claim 19, in which each set comprises composite color component pixel group data and the unidirectional filter operates on adjacent composite pixel groups.

23. A method as claimed in claim 22, in which the unidirectional filter operates on the pixel data of the same color components of the adjacent composite pixel groups.

24. A method as claimed in claim 19, in which the unidirectional filter forms each processed pixel data as a linear combination of the unprocessed pixel data and at least one adjacent pixel data.

25. A method as claimed in claim 24, in which the at least one adjacent pixel data is one adjacent pixel data.

26. A method as claimed in claim 24, in which the linear combination is a normalized linear combination.

27. A method as claimed in claim 24, in which the at least one adjacent pixel data represents at least one horizontally adjacent pixel.

28. A method as claimed in claim 19, in which the unidirectional filter operates in real time.

29. A method of processing image data for display by a multiple-view display device, the method comprising:
receiving a plurality of sets of image pixel data, where each set represents the pixel brightnesses of a respective image or sequence of images;
processing the sets of image pixel data by comparing, for each of a plurality of subsets of each of at least one of the sets where each subset includes at least four pixels and represents the brightnesses of a same number of pixel groups and each pixel group comprises at least one pixel, the brightness pattern of the pixel groups of the subset with a first predetermined pattern; wherein,
when the pixel brightness pattern substantially matches the first predetermined pattern, applying a first filter to derive a first processed brightness of at least one of the pixel groups of the subset, and
when the pixel brightness pattern does not substantially match the first predetermined pattern, applying a unidirectional filter to derive a first processed brightness of at least one of the pixel groups of the subset, the unidirectional filter processing pixels only on one side of the processed pixel.

30. A method as claimed in claim 29, in which the comparing comprises forming the difference between the brightnesses of immediately adjacent pixel groups of each subset.

31. A method as claimed in claim 30, in which the comparing further comprises comparing the differences with at least one threshold.

32. A method as claimed in claim 29, in which each pixel group comprises a composite color pixel group of color component pixels.

33. A method as claimed in claim 32, in which the brightness of each pixel group is formed as a weighted sum of the brightnesses of the color component pixels.

34. A method as claimed in claim 32, in which the brightness of each pixel group is formed as the brightness of one of the color component pixels.

35. A method as claimed in claim 34, in which the brightness of each pixel group is formed as the brightness of a green one of the color component pixels.

36. A method as claimed in claim 29, in which the first filter is an identical filter which does not change the pixel data.

37. A method as claimed in claim 29, comprising, for each of the plurality of subsets, comparing the brightness pattern of the pixel groups of the subset with a second predetermined pattern and, if the pixel brightness pattern substantially matches the second predetermined pattern, applying a third filter to derive a third processed brightness of at least one of the pixel groups of the subset.

38. A method as claimed in claim 29, in which the pixels of each subset are contiguous and extend substantially in one dimension.

39. A method as claimed in claim 19, in which the pixels of each subset comprise a contiguous two dimensional arrangement.

40. A method as claimed in claim 29, in which the comparing is repeated following receipt of each pixel group data.

41. A method as claimed in claim 29, comprising interleaving the processed sets for supply to the display device.

* * * * *